(12) United States Patent
Chang

(10) Patent No.: US 9,719,602 B2
(45) Date of Patent: Aug. 1, 2017

(54) CERAMIC CONTROL VALVE FOR SWITCHING BETWEEN MULTIPLE WATER SOURCES

(71) Applicant: Chia-Po Chang, Changhua (TW)

(72) Inventor: Chia-Po Chang, Changhua (TW)

(73) Assignee: HAIN YO ENTERPRISES CO. LTD., Changhua (TW)

( * ) Notice: Subject to any disclaimer, the term of this patent is extended or adjusted under 35 U.S.C. 154(b) by 0 days.

(21) Appl. No.: 14/882,727

(22) Filed: Oct. 14, 2015

(65) Prior Publication Data

US 2017/0108127 A1    Apr. 20, 2017

(51) Int. Cl.
  *F16K 11/072*    (2006.01)
  *E03C 1/04*    (2006.01)
  *F16K 27/04*    (2006.01)
  *E03C 1/02*    (2006.01)

(52) U.S. Cl.
  CPC .............. *F16K 11/072* (2013.01); *E03C 1/04* (2013.01); *F16K 27/04* (2013.01); *E03C 2001/026* (2013.01)

(58) Field of Classification Search
  CPC ................... F16K 11/072; F16K 27/04; Y10T 137/86815; Y10T 137/86823; Y10T 137/86863; E03C 1/04; E03C 2001/026
  USPC .............................. 137/625.4, 625.41, 625.46
  See application file for complete search history.

(56) References Cited

U.S. PATENT DOCUMENTS

| 4,327,758 | A | * | 5/1982 | Uhlmann | F16K 11/0782 137/625.17 |
|---|---|---|---|---|---|
| 4,423,752 | A | * | 1/1984 | Psarouthakis | F16K 11/022 137/270 |
| 4,540,023 | A | * | 9/1985 | Pawelzik | F16K 11/0787 137/625.17 |
| 5,329,958 | A | * | 7/1994 | Bosio | F16K 11/078 137/269 |
| 5,853,023 | A | * | 12/1998 | Orlandi | F16K 11/0787 137/271 |
| 6,123,105 | A | * | 9/2000 | Yang | F16K 11/0743 137/270 |
| 6,789,573 | B2 | * | 9/2004 | Knapp | F16K 11/0743 137/315.15 |
| 6,892,761 | B2 | * | 5/2005 | Chen | F16K 11/0743 137/625.4 |
| 7,021,335 | B2 | * | 4/2006 | Yang | F16K 11/0746 137/625.41 |
| 7,174,916 | B2 | * | 2/2007 | Chang | F16K 11/0743 137/625.41 |

(Continued)

*Primary Examiner* — Michael R Reid
(74) *Attorney, Agent, or Firm* — Che-Yang Chen; Law Offices of Scott Warmuth

(57) ABSTRACT

A ceramic control valve may include a control valve bolt, an upper ceramic piece, and a lower ceramic piece secured in a valve shell, and a valve base formed on a bottom of the ceramic control valve connects with the valve shell to prevent the components from falling out of valve shell. The ceramic control valve of the faucet can control the tap water and the filtered water, and also provides hot water, cold water, or different mixing ratios of hot water and cold water without installing another ceramic control valve. Therefore, the design of the present invention simplifies the complexity in structure, and it is convenient for a user to control the filtered water and the tap water with the different mixing ratios of hot water and cold water by a single ceramic control valve.

5 Claims, 8 Drawing Sheets

(56) References Cited

U.S. PATENT DOCUMENTS

| | | | | |
|---|---|---|---|---|
| 8,613,293 B2* | 12/2013 | Bolgar | ............... | F16K 11/0743 |
| | | | | 137/597 |
| 8,869,816 B2* | 10/2014 | Chang | ............... | F16K 11/0787 |
| | | | | 137/100 |
| 8,875,737 B2* | 11/2014 | Cattaneo | ............ | F16K 11/0787 |
| | | | | 137/625.4 |
| 8,985,147 B2* | 3/2015 | Chang | ..................... | F16K 11/18 |
| | | | | 137/597 |
| 8,985,148 B2* | 3/2015 | Chang | ................. | F16K 11/076 |
| | | | | 137/597 |
| 2004/0256011 A1* | 12/2004 | Chen | ................. | F16K 11/0743 |
| | | | | 137/625.4 |
| 2007/0044850 A1* | 3/2007 | Pieters | ............... | F16K 11/0787 |
| | | | | 137/597 |
| 2012/0145936 A1* | 6/2012 | Chang | ............... | F16K 11/0787 |
| | | | | 251/281 |
| 2014/0345729 A1* | 11/2014 | Chang | .................. | F16K 11/076 |
| | | | | 137/625.15 |
| 2014/0345730 A1* | 11/2014 | Chang | .................... | F16K 11/18 |
| | | | | 137/625.17 |
| 2015/0144214 A1* | 5/2015 | Chang | .................... | F16K 11/02 |
| | | | | 137/625.41 |
| 2016/0289931 A1* | 10/2016 | Chang | ................ | F16K 11/0787 |

\* cited by examiner

CERAMIC CONTROL VALVE FOR SWITCHING BETWEEN MULTIPLE WATER SOURCES

FIELD OF THE INVENTION

The present invention relates to a ceramic control valve for switching between different water sources, and more particularly to a single ceramic control valve to control the tap water and filtered water.

BACKGROUND OF THE INVENTION

By rotating or moving up the handle of the faucet, a conventional control valve for a faucet can control the open/close operation, the mixing ratio of cold water and hot water, or the amount of water flow.

However, the conventional control valve is disadvantageous because: (i) one control valve can only be used for one kind of flow. In other words, when a faucet has to provide two different kinds of flows (such as tap water and filtered water, and the tap water still need to include the mixing function for the cold and hot water), there is a need to install another control valve in the faucet. As a result, it increases the complexity of the structure of faucet; and (ii) it is inconvenient for a user to operate two control valves in the same time. Therefore, there remains a need for a new and improved design for a ceramic control valve for filtering and mixed water to overcome the problems presented above.

SUMMARY OF THE INVENTION

The present invention provides a ceramic control valve, which comprises a valve shell, a control valve bolt, an upper ceramic piece, a lower ceramic piece and a valve base. From top to bottom, a lower portion of control valve bolt, the upper ceramic piece, and the lower ceramic piece are secured inside of the valve shell, and the valve base located on a bottom portion of the ceramic control valve is engaged with the valve shell to prevent inside components from falling out of the valve shell. The valve shell has a compartment, and an opening is formed at a top portion of the valve shell. The control shaft bolt is secured in the compartment of the valve shell, and an upper portion of the control shaft bolt penetrates through the opening to stick out from the valve shell. Two protruding pieces formed at inner wall of the valve shell are separated from a center of the valve shell with an appropriate rotation angle, and a locating portion with a depression on a top portion thereof is formed on a rotating path of the two protruding pieces. An outlet hole laterally penetrates a peripheral wall of the valve shell to connect to the compartment. A shaft base is connected to the control shaft bolt, and can be driven to rotate with the control shaft bolt simultaneously. A driving piece is formed at an outer periphery of the shaft base, and each of two lateral ends of the driving piece has a blocking portion to achieve blocking effect. A spring is disposed on the driving piece to upwardly bear against a locating bolt, and at least two driving blocks protrude from a bottom portion of the shaft base. The upper ceramic piece comprises a cutout formed at an edge thereof for water flow, and a recessed portion is upwardly formed at a central portion of a bottom of the upper ceramic piece. An extending portion connected to the recessed portion is extended from an edge of the recessed portion. At least two driving slots formed at a top portion of the upper ceramic piece are configured to connect to the driving blocks of the control shaft bolt. The upper ceramic piece downwardly bears against a top surface of the lower ceramic piece in the compartment, and the upper ceramic piece is upwardly connected to the control shaft bolt by engaging the driving slot with the driving blocks of the control shaft bolt. A bottom portion of the lower ceramic piece has an arc-shaped cold water conduit and an arc-shaped hot water conduit formed in opposite direction. A water filtering conduit is formed between the cold water conduit and the hot water conduit. A cold water hole, a hot water hole and a water filtering hole respectively connected to each of ends of the cold water conduit, hot water conduit and water filtering conduit upwardly penetrate the lower ceramic piece, and a position of the cold water hole is adjacent to the hot water hole. A central portion of the lower ceramic piece has a first water outlet, and a peripheral edge of the lower ceramic piece comprises a plurality of engaging grooves to engage with the valve base. A second water outlet is formed at a central portion of the valve seat, and an outer periphery of the second water outlet has a first water channel, a second water channel, and a third water channel to respectively connect the cold water source, the hot water source and the filtered water. At least an engaging piece upwardly protrudes from the valve base to engage with the lower ceramic piece and valve shell. Thus, each of the second water outlet, the first water channel, the second water channel and the third water channel can be aligned with the first water outlet, cold water conduit, hot water conduit and water filtering conduit respectively. Also, each of gaskets is respectively disposed on outer peripheries of the second water outlet, the first water channel, the second water channel and the third water channel, which are on the top or bottom of valve base.

Comparing with conventional ceramic control valve, the present invention is advantageous because: (i) the ceramic control valve of the faucet can control the tap water and the filtered water, and also provides hot water, cold water, or different mixing ratios of hot water and cold water without installing another ceramic control valve. Therefore, the design of the present invention simplifies the complexity in structure; and (ii) it is convenient for a user to manage the filtered water and the tap water with different mixing ratios of hot water and cold water by a single ceramic control valve.

DETAILED DESCRIPTION OF THE INVENTION

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

Figure 1:
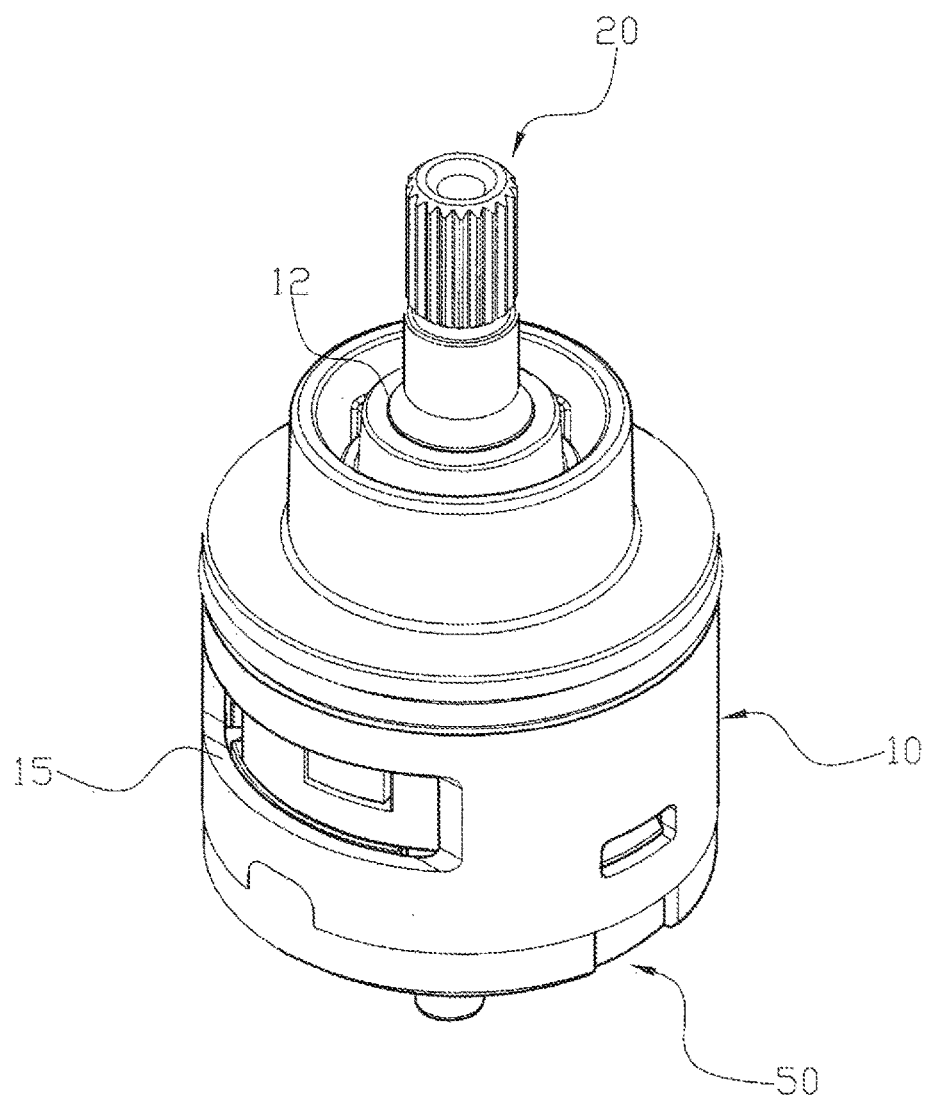
FIG. 1 is a three-dimensional assembly of the ceramic control valve in present invention.
Figure 2:
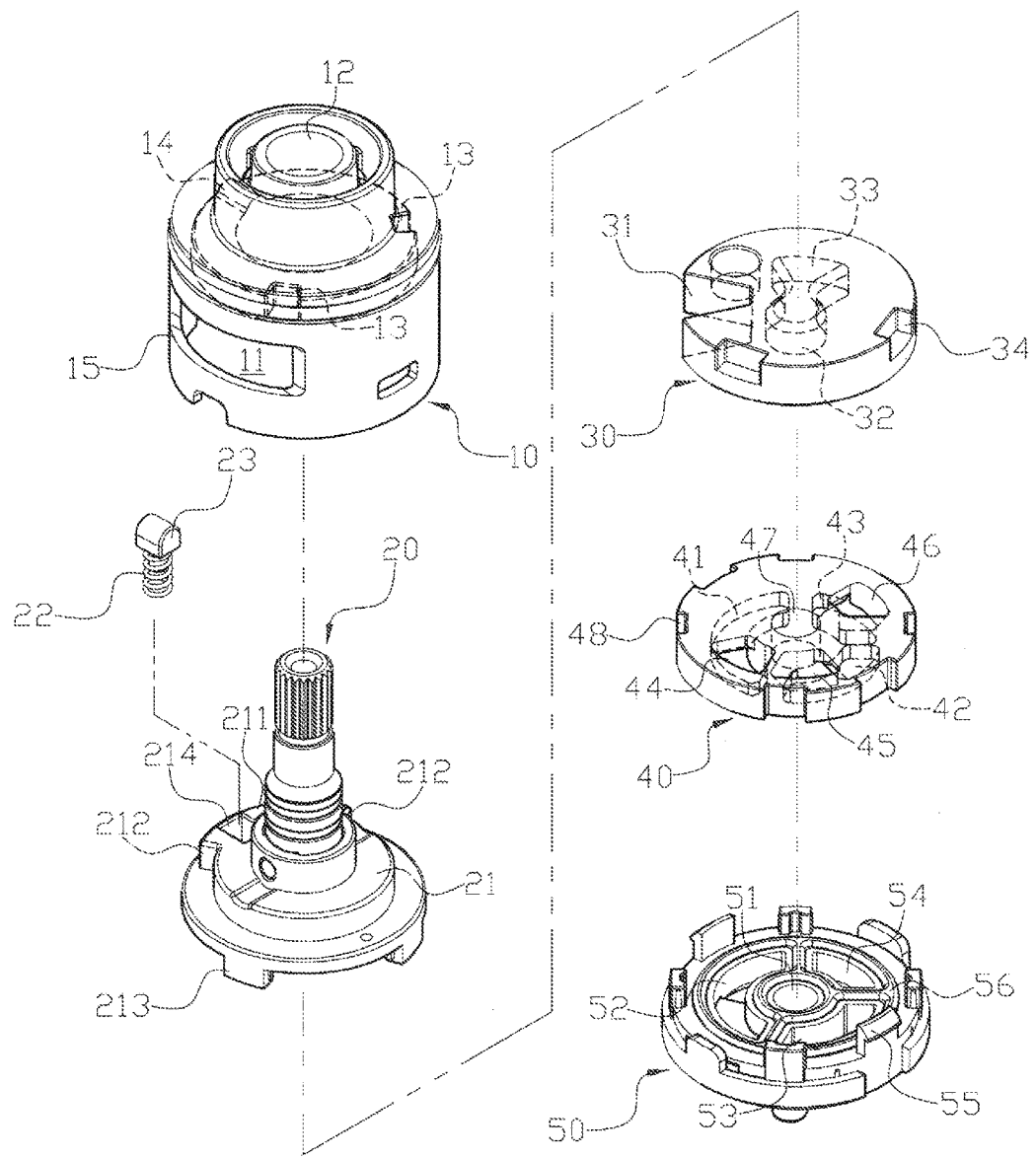
FIG. 2 is a three-dimensional, exploded view of the ceramic control valve in present invention.
Figure 4:
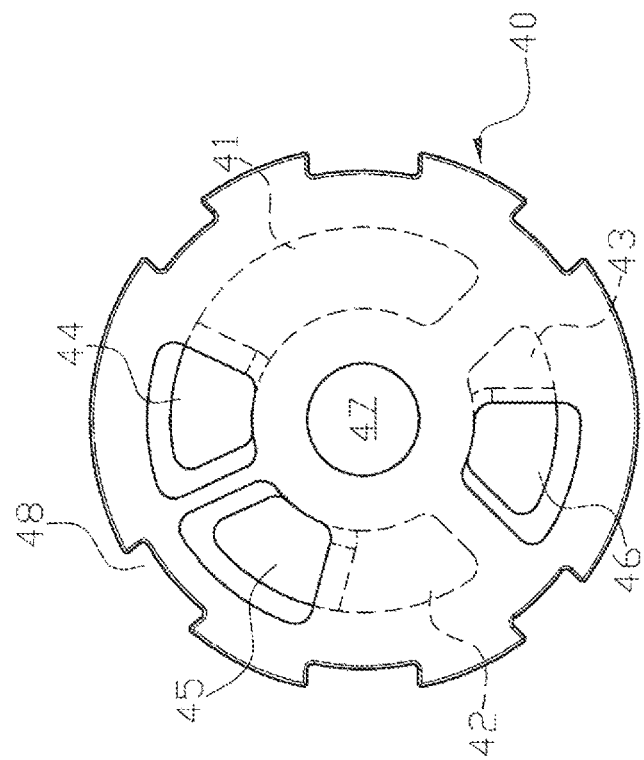
FIG. 4 is a plane view of the lower ceramic piece of the ceramic control valve in present invention.
Figure 3:
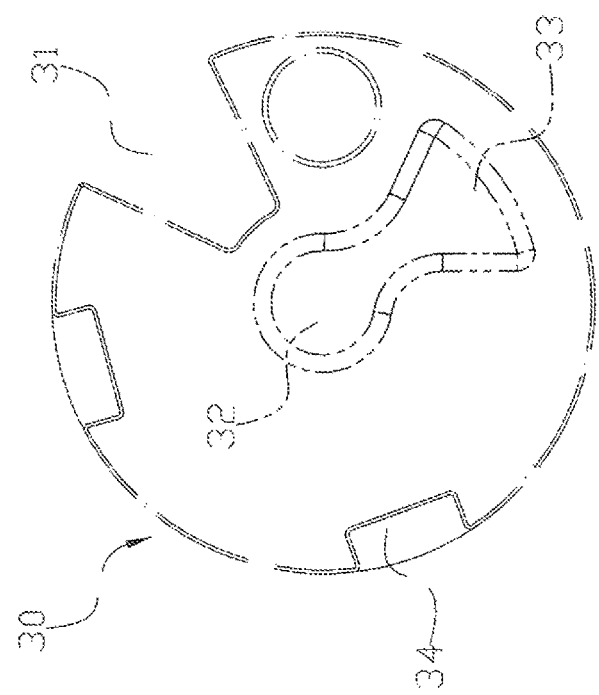
FIG. 3 is a plane view of the upper ceramic piece of the ceramic control valve in present invention.
Figure 5:
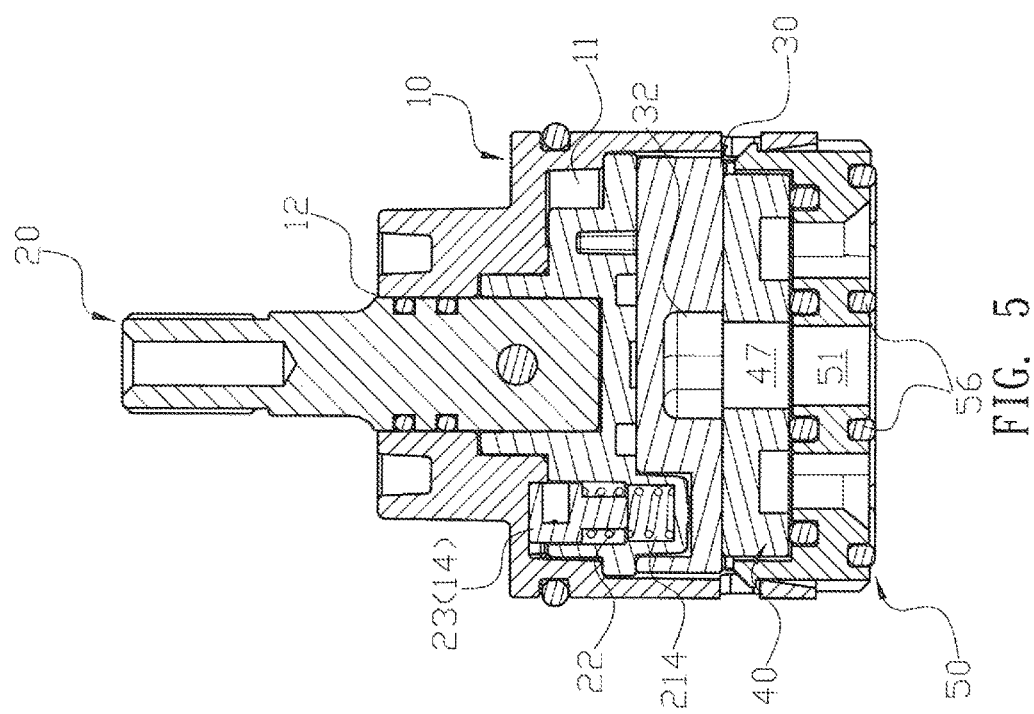
FIG. 5 is a sectional assembly of the ceramic control valve in present invention.

In order to further understand the goal, characteristics and effect of the present invention, a number of embodiments along with the drawings are illustrated as following:

Referring to FIGS. 1 and 5, the present invention provides a ceramic control valve, which comprises a valve shell (10), a control valve bolt (20), an upper ceramic piece (30) a lower ceramic piece (40) and a valve base (50). From top to bottom, a lower portion of control valve bolt (20), the upper ceramic piece (30), the lower ceramic piece (40) are secured inside of the valve shell (10), and the valve base (50) located on a bottom portion of the ceramic control valve is engaged with the valve shell (10) to prevent inside components from falling out of the valve shell (10). The valve shell (10) has a compartment (11), and an opening (12) is formed at a top portion of the valve shell (10). The control shaft bolt (20) is secured in the compartment (11) of the valve shell (10), and an upper portion of the control shaft bolt (20) penetrates through the opening (12) to stick out from the valve shell (10). Two protruding pieces (13) formed at inner wall of the valve shell (10) are separated from a center of the valve shell (10) with an appropriate rotation angle, and a locating portion (14) with a depression on a top portion thereof is formed on a rotating path of the two protruding pieces (13). An outlet hole (15) laterally penetrates a peripheral wall of the valve shell (10) to connect to the compartment (11). A shaft base (21) is connected to the control shaft bolt (20), and can be driven to rotate with the control shaft bolt (20) simultaneously. A driving piece (211) is formed at an outer periphery of the shaft base (21), and each of two lateral ends of the driving piece (211) has a blocking portion (212) to achieve blocking effect. A spring (22) is disposed on the driving piece (211) to upwardly bear against a locating bolt (23), and at least two driving blocks (213) protrude from a bottom portion of the shaft base (21). The upper ceramic piece (30) comprises a cutout (31) formed at an edge thereof for water flow, and a recessed portion (32) is upwardly formed at a central portion of a bottom of the upper ceramic piece (30). An extending portion (33) connected to the recessed portion (32) is extended from an edge of the recessed portion (32). At least two driving slots (34) formed at a top portion of the upper ceramic piece (30) are configured to connect to the driving blocks (213) of the control shaft bolt (20). The upper ceramic piece (30) downwardly bears against a top surface of the lower ceramic piece (40) in the compartment (10), and the upper ceramic piece (30) is upwardly connected to the control shaft bolt (20) by engaging the driving slot (34) with the driving blocks (213) of the control shaft bolt (20). A bottom portion of the lower ceramic piece (40) has an arc-shaped cold water conduit (41) and an arc-shaped hot water conduit (42) formed in opposite direction. A water filtering conduit (43) is formed between the cold water conduit (41) and the hot water conduit (42). A cold water hole (44), a hot water hole (45) and a water filtering hole (46) respectively connected to each of ends of the cold water conduit (41), hot water conduit (42) and water filtering conduit (43) upwardly penetrate the lower ceramic piece (40), and a position of the cold water hole (44) is adjacent to the hot water hole (45). A central portion of the lower ceramic piece (40) has a first water outlet (47), and a peripheral edge of the lower ceramic piece (40) comprises a plurality of engaging grooves (48) to engage with the valve base (50). A second water outlet (51) is formed at a central portion of the valve seat (50), and an outer periphery of the second water outlet (51) has a first water channel (52), a second water channel (53), and a third water channel (54) to respectively connect the cold water source, the hot water source and the filtered water source. At least an engaging piece (55) upwardly protrudes from the valve base (50) to engage with the lower ceramic piece (40) and valve shell (10). Thus, each of the second water outlet (51), the first water channel (52), the second water channel (53) and the third water channel (54) can be aligned with the first water outlet (47), cold water conduit (41), hot water conduit (42) and water filtering conduit (43) respectively. Also, each of gaskets (56) is respectively disposed on outer peripheries of the second water outlet (51), the first water channel (52), the second water channel (53) and the third water channel (54), which are on the top or bottom of valve base (50).

Figure 6:
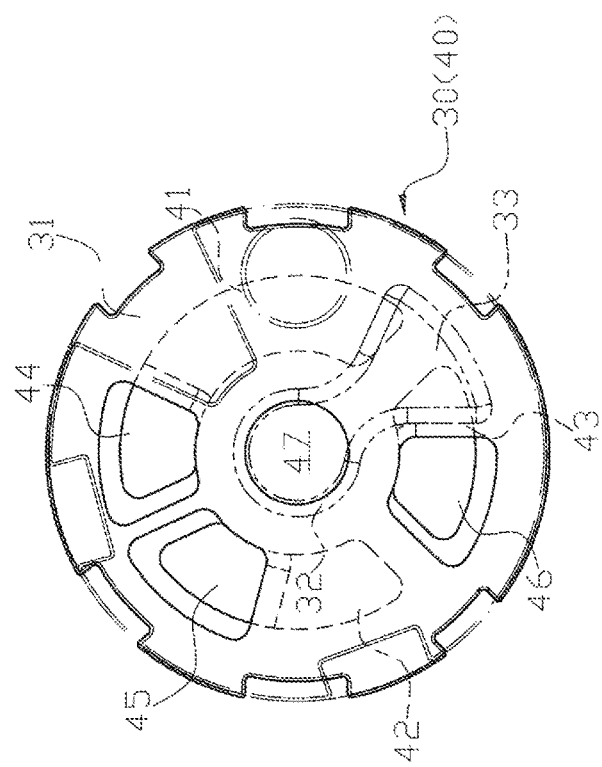
FIG. 6 is an illustration of relative positions of the upper ceramic piece and the lower ceramic piece of the ceramic control valve in present invention when the faucet is closed.

In actual application, the ceramic control valve is installed inside of a valve chamber of the faucet, and is externally connected to a handle by the control shaft bolt (20). By the operation of the handle, the faucet not only can provide the tap water, but also can provide the filtered water conducted from the faucet into the ceramic control valve. Also, the faucet can control the different mixing ratios of the cold water and the hot water to provide the tap water with different temperatures. When the faucet is closed, the control shaft bolt (20) is located at a central position. Thus, the locating bolt (23) is borne against by the spring (22) to engage with the locating portion (14). In the same time, the cutout (31) and the extending portion (33) of upper ceramic piece (30) is misaligned with the cold water hole (44), the hot water hole (45) and the water filtering hole (46), and the cold water, hot water, and filtered water are blocked off, resulting in the faucet being closed (as shown in FIG. 6).

Figure 8:
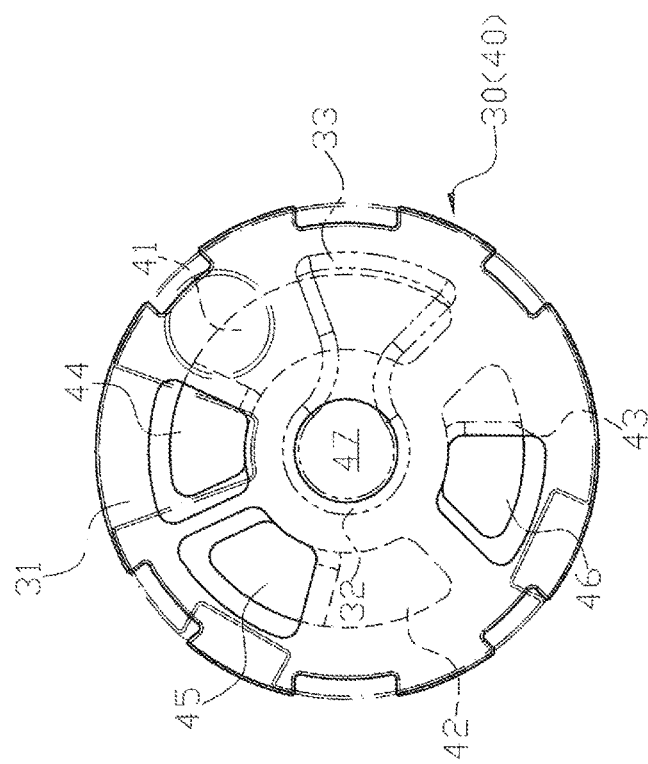
FIG. 8 is an illustration of relative positions of the upper ceramic piece and the lower ceramic piece of the ceramic control valve in present invention, when the faucet provides only cold water of the tap water.
Figure 7:
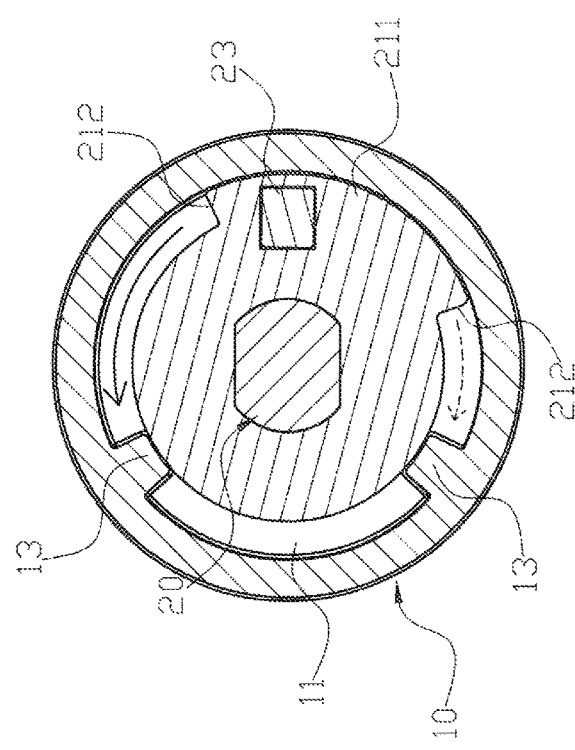
FIG. 7 is a schematic view of the ceramic control valve in present invention when the valve is used to rotate in each of two different directions.
Figure 10:
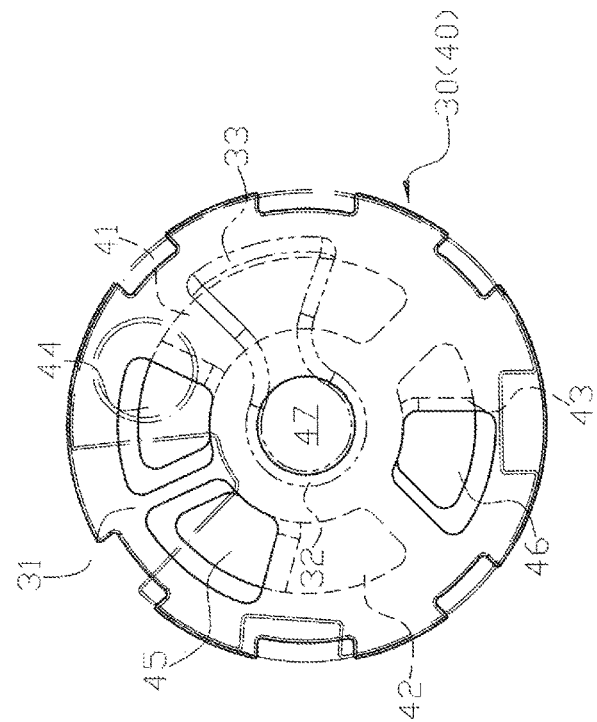
FIG. 10 is an illustration of relative positions of the upper ceramic piece and the lower ceramic piece of the ceramic control valve in present invention, when the faucet provides the tap water with mixed cold and hot water.
Figure 9:
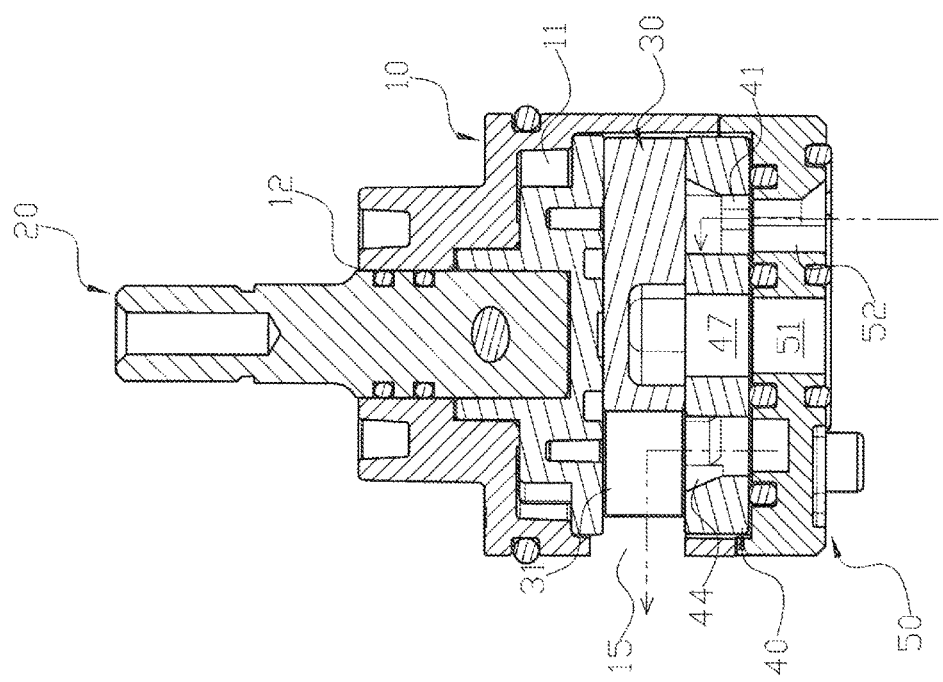
FIG. 9 is sectional view of the ceramic control valve in present invention, when the tap water is provided by the faucet.
Figure 12:
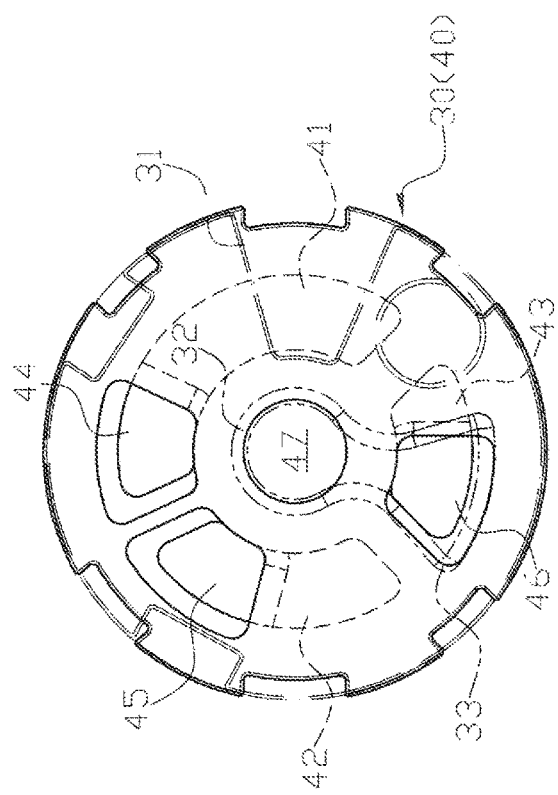
FIG. 12 is an illustration of relative positions of the upper ceramic piece and the lower ceramic piece of the ceramic control valve in present invention when the faucet provides the filtered water.
Figure 11:
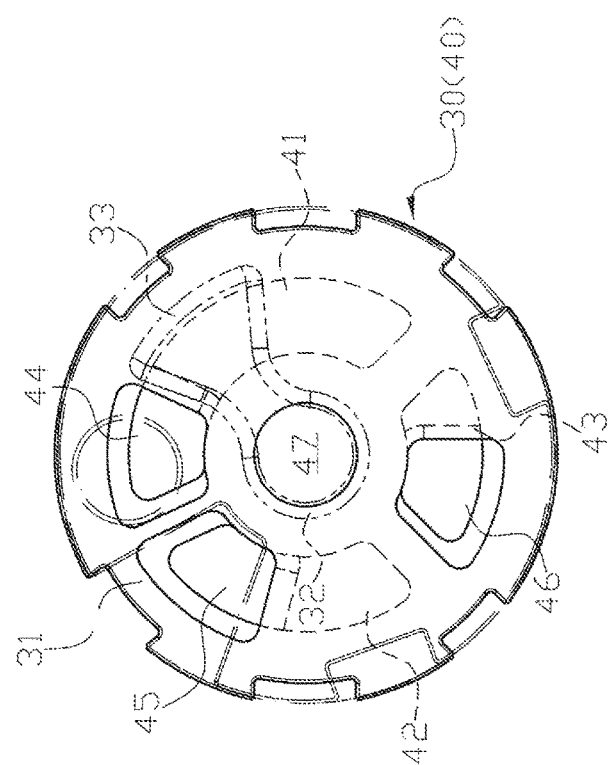
FIG. 11 is an illustration of relative positions of the upper ceramic piece and the lower ceramic piece of the ceramic control valve in present invention when the faucet provides only hot water of the tap water.
Figure 13:
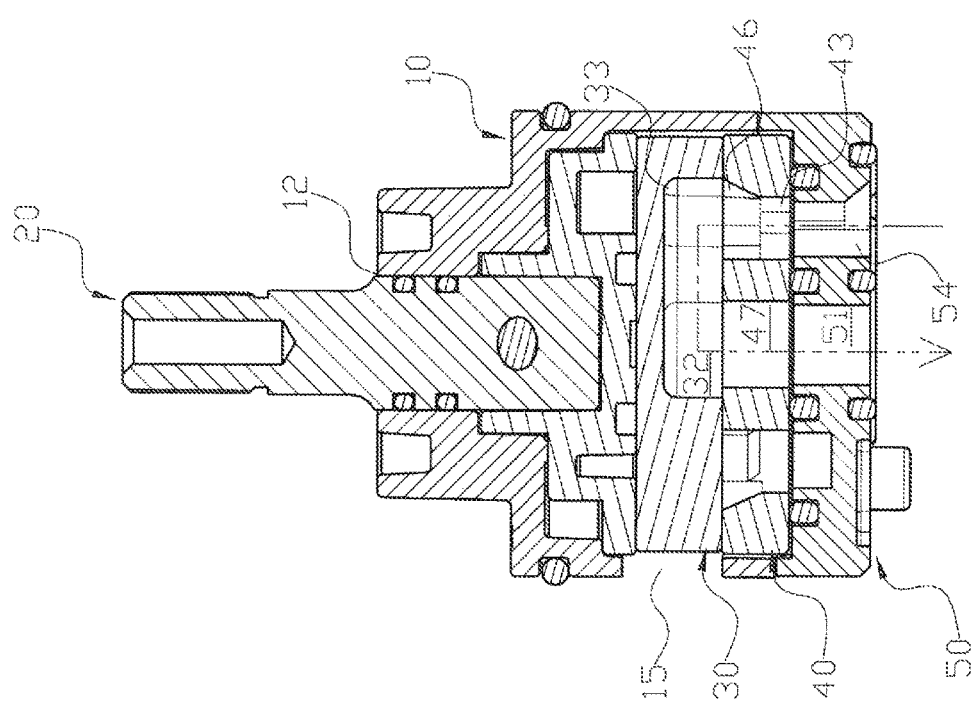
FIG. 13 is sectional view of the ceramic control valve in present invention when the filtered water is provided by the faucet.

The faucet can be opened, when the handle is rotated in one direction (as shown in FIG. 7). The control shaft bolt (20) driven by the handle can rotate the shaft base (21), and the upper ceramic piece (30) can be driven by the shaft base (21) to rotate simultaneously. By aligning the cutout (31) with the cold water hole (44), the cold water can flow from the first water channel (52) through the cold water conduit (41), cold water hole (44) and the cutout (31), and flows out of the faucet from the outlet out (15) of the valve shell (10) (as shown in FIGS. 8 and 9). Since the extending portion (33) will not be aligned with the water filtering hole (46) by rotating the upper ceramic piece (30) in this direction, the filtered water will not flow through the recessed portion (32), and the filtered water will not flow out from the first water outlet (47) and the second water outlet (51) of the valve base (50). Moreover, by continuing to rotate the handle of the faucet with larger angle, the cutout (31) can be aligned with the hot water hole (45) and cold water hole (44) simultaneously to provide different mixing ratios of the cold water and the hot water (as shown in FIG. 10). When the handle is continued to rotate with its maximum angle, the cutout (31) will only be aligned with hot water hole (45) to particularly provide hot water only (as shown in FIG. 11). When the user rotates the handle back to its initial position, the locating bolt (23) with the spring (22) will be engaged with the locating portion (14), resulting in the faucet backing to closed state.

On the other hand, the faucet can provide the filtered water by rotating the handle in the other direction (as shown in FIG. 7), and the control valve bolt (20) can drive the shaft base (21) and the upper ceramic piece (30) simultaneously to rotate in the other direction. By aligning the extending portion (33) with the water filtering hole (46), the filtered water from the third water channel (54) can flow through the water filtering conduit (43), the water filtering hole (46), the extending portion (33), the recessed portion (32), the first water outlet (47), and flow out of an inner outlet tube of the faucet from the second water outlet (51) of the valve base (50). Also, the maximum rotated angle of the control shaft valve (20) and the upper ceramic piece (30) can be limited when the blocking portion (212) is borne against the protruding pieces (13). As a result, the control shaft valve (20) and the upper ceramic piece (30) will not be over rotated, and the tap water will not unwittingly flow from the inner outlet tube of the faucet.

In one embodiment, the driving piece (211) comprises a locating hole (214) to engage with locating bolt (23) with the spring (22). The locating hole (213) horizontally protrudes from the shaft base (21) to allow the control shaft bolt (20) to engage with the upper ceramic piece (30).

Comparing with conventional ceramic control valve, the present invention is advantageous because: (i) the ceramic control valve of the faucet can switch between the tap water and the filtered water, and also provides hot water, cold water, or different mixing ratios of hot water and cold water without installing another ceramic control valve. Therefore, the design of the present invention simplifies the complexity in structure; and (ii) it is convenient for a user to control the filtered water and the tap water with the different mixing ratios of hot water and cold water by a single ceramic control valve.

Having described the invention by the description and illustrations above, it should be understood that these are exemplary of the invention and are not to be considered as limiting. Accordingly, the invention is not to be considered as limited by the foregoing description, but includes any equivalents.

What is claimed is:

1. A ceramic control valve comprising, from top to bottom, a control valve bolt, an upper ceramic piece, and a lower ceramic piece secured in a valve shell, and a valve base formed on a bottom of the ceramic control valve connected with the valve shell to prevent the components from falling out of the valve shell, the valve shell having a compartment, and an opening formed at a top portion of the valve shell, and an upper portion of the control shaft bolt penetrating through the opening to stick out from the valve shell, and a shaft base connected with the control shaft bolt, and the shaft base is driven to rotate with the control shaft bolt simultaneously, wherein an outlet hole laterally penetrates a peripheral wall of the valve shell to connect to the compartment, and the upper ceramic piece comprises a cutout formed at an edge thereof for water flow, and a recessed portion is upwardly formed at a central portion of a bottom of the upper ceramic piece, wherein an extending portion connected to the recessed portion is extended from an edge of the recessed portion, wherein a bottom portion of the lower ceramic piece has an arc-shaped cold water conduit and an arc-shaped hot water conduit formed in an opposite direction, wherein a water filtering conduit is formed between the cold water conduit and the hot water conduit, and one end of each of the cold water conduit, hot water conduit and water filtering conduit has a cold water hole, a hot water hole and a water filtering hole respectively to upwardly penetrate the lower ceramic piece, and a position of the cold water hole is adjacent to the hot water hole, wherein a central portion of the lower ceramic piece has a first water outlet, and a second water outlet formed at a central portion of the valve base, and an outer periphery of the second water outlet has a first water channel, a second water channel, and a third water channel to respectively connect the cold water source, the hot water source and the filtered water source, wherein the upper ceramic piece, the lower ceramic piece and the valve base are connected in sequence in the compartment of the valve shell, and the lower ceramic piece engages with the valve base by at least an engaging piece, and the upper ceramic piece is connected to the shaft base, wherein when the lower ceramic piece is connected to the valve base, the second water outlet of the valve base, the first water channel, the second water channel and the third water channel can be aligned with the first water outlet of the lower ceramic piece, the cold water conduit, the hot water conduit and the water filtering conduit respectively.

2. The ceramic control valve of claim 1, wherein two protruding pieces formed at an inner wall of the valve shell are separated from a center of the valve shell with an appropriate rotation angle, and a locating portion with a depression on a top portion thereof is formed on a rotating path of the two protruding pieces, wherein a driving piece is formed at an outer periphery of the shaft base, and each of two lateral ends of the driving piece has a blocking portion to achieve a blocking effect, wherein a spring is disposed on the driving piece to upwardly bear against a locating bolt.

3. The ceramic control valve of claim 1, wherein at least two driving blocks protrude from a bottom portion of the shaft base, and at least two driving slots formed at a top portion of the upper ceramic piece are configured to connect to the driving blocks of the control shaft bolt, wherein when the upper ceramic piece downwardly bears against a top surface of the lower ceramic piece in the compartment, the upper ceramic piece is upwardly connected to the control shaft bolt by engaging the driving slot with the driving blocks of the control shaft bolt.

4. The ceramic control valve of claim 1, wherein a peripheral edge of the lower ceramic piece comprises a plurality of engaging grooves, and at least an engaging piece upwardly protrudes from the valve base to engage with the lower ceramic piece and valve shell.

5. The ceramic control valve of claim 1, wherein a gasket is respectively disposed on outer peripheries of the second water outlet, the first water channel, the second water channel and the third water channel, which are on the top of the valve base.

\* \* \* \* \*